US011509710B2

(12) United States Patent
Lerzer et al.

(10) Patent No.: US 11,509,710 B2
(45) Date of Patent: Nov. 22, 2022

(54) METHOD FOR OPERATING A MOTOR VEHICLE AND MOTOR VEHICLE

(71) Applicant: AUDI AG, Ingolstadt (DE)

(72) Inventors: Juergen Lerzer, Neumarkt (DE); Matthijs Paffen, Karlskron (DE); Hans-Georg Gruber, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 30 days.

(21) Appl. No.: 15/888,696

(22) Filed: Feb. 5, 2018

(65) Prior Publication Data

US 2018/0241810 A1    Aug. 23, 2018

(30) Foreign Application Priority Data

Feb. 6, 2017  (DE) .......................... 102017201789.9

(51) Int. Cl.
*H04L 67/1008*   (2022.01)
*H04L 67/10*     (2022.01)
(Continued)

(52) U.S. Cl.
CPC ........ *H04L 67/1008* (2013.01); *H04L 47/783* (2013.01); *H04L 67/10* (2013.01);
(Continued)

(58) Field of Classification Search
CPC ..... H04L 67/1008; H04L 67/10; H04L 67/16; H04L 47/783; G06F 9/5027
See application file for complete search history.

(56) References Cited

U.S. PATENT DOCUMENTS 9,146,603 B2    9/2015 Reber
10,459,444 B1 * 10/2019 Kentley-Klay ........ G07C 5/008
(Continued)

FOREIGN PATENT DOCUMENTS

| EP | 2410427 A1 | 1/2012 |
| EP | 2769809 A1 | 8/2014 |
| EP | 2950278 A2 | 12/2015 |

OTHER PUBLICATIONS

S. Abdelhamid, H. S. Hassanein and G. Takahara, "Vehicle as a resource (VaaR)," in IEEE Network, vol. 29, No. 1, pp. 12-17, Jan.-Feb. 2015, Accessed at https://ieeexplore.ieee.org/abstract/document/7018198. (Year: 2015).*

(Continued)

*Primary Examiner* — Nam T Tran
(74) *Attorney, Agent, or Firm* — Sterne, Kessler, Goldstein & Fox P.L.L.C.

(57) ABSTRACT

A method is disclosed for operating a motor vehicle having a computing device providing computing power, a communication device for communicating with a vehicle-external cloud provided with a server device, and a control device, wherein the control device performs an availability check indicating the existence of free computing power available from the motor vehicle for executing a computing task provided by a currently-reachable cloud as determined by the motor vehicle's communication device. From within a list of currently-reachable clouds, a target cloud to which the motor vehicle's computing power must be provided is selected either manually by user input or at least partially automatically based on availability parameters. Once a target cloud is selected, a communication link with the target cloud is established and the motor vehicle is logged into the target cloud as a provider of computing power. A motor vehicle for performing the method is also disclosed.

20 Claims, 3 Drawing Sheets

(51) Int. Cl.
    *H04L 67/51*     (2022.01)
    *H04L 67/54*     (2022.01)
    *H04L 47/783*     (2022.01)
    *G06N 3/08*     (2006.01)
    *G06F 9/50*     (2006.01)

(52) U.S. Cl.
    CPC .............. *H04L 67/51* (2022.05); *H04L 67/54* (2022.05); *G06F 9/5027* (2013.01); *G06N 3/08* (2013.01)

(56) References Cited

U.S. PATENT DOCUMENTS

| | | | | |
|---|---|---|---|---|
| 2002/0188384 A1* | 12/2002 | Becker | ................. | G06F 9/5072 701/1 |
| 2013/0304863 A1* | 11/2013 | Reber | ................. | H04L 67/10 709/218 |
| 2015/0088352 A1* | 3/2015 | Gunter | ................. | H04L 67/10 709/227 |

OTHER PUBLICATIONS

Bonomi et al., "Fog Computing and Its Role in the Internet of Things," Proceedings of the First Edition of the MCC Workshop on Mobile Cloud Computing, Aug. 17, 2012; pp. 13-16.

Gazizadeh et al., "Towards Fault-Tolerant Job Assignment in Vehicular Cloud Computing," IEEE International Conference on Services Computing, 2015; pp. 17-24.

Piro et al., "D2D in LTE Vehicular Networking: System Model and Upper Bound Performance," 7th International Congress on Ultra Modern Telecommunications and Control Systems and Workshops, 2015; pp. 281-286.

Qin et al., "Vehicular Cloud: Cloud Computing Facilitating Routing in Vehicular Networks," IEEE 11th International Conference on Trust, Security and Privacy in Computing and Communications, 2012; pp. 1438-1445.

Whaiduzzaman et al., "A Survey on Vehicular Cloud Computing," Journal of Network and Computer Applications, 40 (2014); pp. 325-344.

* cited by examiner

METHOD FOR OPERATING A MOTOR VEHICLE AND MOTOR VEHICLE

CROSS-REFERENCE TO RELATED APPLICATIONS

This application claims the benefit of German Patent Application No. 102017201789.9, filed Feb. 6, 2017, entitled "Method for Operating a Motor Vehicle and Motor Vehicle," the entirety of which is incorporated herein by reference.

TECHNICAL FIELD

This application relates to a method for operating a motor vehicle, which has at least one computing device providing computing power and a communication device for communicating at least with vehicle-external clouds provided with at least one server device. This application also relates to a motor vehicle.

BACKGROUND

From today, into the future, the need for performing computing in a cloud ("cloud computing") will experience a strong growth. The computing power required in the cloud will similarly experience a rapid rise. These computing powers are usually provided by computing devices, which have one or more processors, each provided with one or more cores. In addition to classic processors, such as central processing units (CPUs), dedicated processors, such as those dedicated to machine learning, in particular graphic processing units (GPUs) and neural processor units (NPUs), are used. A further development of the cloud system is known as fog ("Fog computing"). Fog networks are characterized in that, in addition to the computing power of server devices, such as in data centers, more computing power is required on the edge of the cloud to reduce the computing latency and to avoid unnecessary data transmissions in the network to very remote computing nodes. The computing power at the edge of the cloud may be provided, for example, by end user devices or edge apparatuses (edge devices) positioned near the end users.

In parallel to these computing power requirements of the clouds, the computing power requirements within motor vehicles are growing in a drastic way, for both classic computing power (CPU) and more specialized computing power (GPU, NPU). Motor vehicle computing power requirements are driven by so-called evolved driver assistance systems, such as Advanced Driver Assistance Systems (ADAS), infotainment systems such as In-Vehicle-Infotainment (IVI), and in particular systems adapted for an at least partially automated driving of the motor vehicle. The main computing power requirements regarding ADAS reside in the provision of autonomous driving, a completely automatized driving experience that requires additional redundant computing power and high availability and compliance with safety standards. In the case of IVI systems, the requirements of an increasing computing power are mainly due to the desire for a higher number of displays with higher resolutions and advanced infotainment applications, such as in the case of Augmented Reality (AR), extended 3D navigation, video games, and so-called smart systems, such as connected devices within the Internet of Things (IoT), for example.

The fundamental concept of a cloud, in particular of a fog, lies in the reduction of the required computing power or complexity in computing devices of the end user, such as on a motor vehicle, and in the remote execution of more complex computing steps in the cloud or fog.

U.S. Pat. No. 9,146,603 B2 discloses a cloud computing system, a motor vehicle cloud computing device, and a method for the use thereof. In this disclosure, it is proposed that a parking place for motor vehicles that are not in use is provided with a server device, to which parked motor vehicles may log in to create a local cloud, which may provide various services.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

The object of this disclosure is to provide a more efficient method of using computing resources in a cloud, in particular in a fog, and in a motor vehicle.

In the method disclosed herein, if an availability check yields a positive result, indicating the existence of at least a free computing power for executing a computing task provided by a cloud,
  clouds currently reachable by the communication device are determined,
  among the currently reachable clouds, a target cloud is selected, depending on at least one manual user input and/or at least a partially automatic selection, to which the computing power has to be provided, and
  a communication link is established with the cloud, and the motor vehicle is logged into the cloud as a provider of computing power.

According to the method disclosed herein, in the most automated way possible, free computing power of a motor vehicle is provided to a cloud, wherein the method may be used generally and in all operating conditions of the motor vehicle. Currently reachable clouds are automatically detected, and at least one manual user input and/or at least a partially automatic input selects a target cloud, to which the motor vehicle logs in to establish a connection. The connection allows the motor vehicle to provide the free currently-unused computing power in response to a corresponding need for compensation of computing power. Here, logging in means that the motor vehicle becomes part of the target cloud, in particular part of the fog, and is coupled to the communication network forming the cloud. To this end, the motor vehicle may have a central control device, such as a control apparatus, which executes the aforementioned steps. Thus, when a target cloud is selected, by corresponding control of the communication device, the communication link with the target cloud is established, and the at least one computing device of the motor vehicle, which has to provide the free computing power, is correspondingly reconfigured to execute computing tasks obtained from the target cloud. The allocation of computing steps or the general administration of computing tasks can alternatively take control of the central control device of the motor vehicle.

In case of an availability check indicating the fulfilment of a termination condition, it may be foreseen that the motor vehicle is again logged out from the target cloud, wherein the termination condition may include or verify the transition to another operating mode, thus being adapted as a switching condition. A termination condition may also, in particular, be event-controlled, as detailed in the following paragraphs. For example, an event may be the occurrence of or the imminent restarting of the motor vehicle for driving operation.

Thus, in principle, for each of the at least one computing device, two conditions occur: (1) at least a condition in which the computing power is used for the motor vehicle, and (2) at least another condition, in which the computing power is used for computing tasks in a cloud, in particular in a fog. The corresponding reconfiguring of the at least one computing device, as previously mentioned, may be executed, in particular, by the central control device of the motor vehicle.

Computing devices providing computing power in a motor vehicle may in particular be provided with at least one processor comprising, in particular, at least one computing core. The corresponding processors may be provided as a CPU, GPU, NPU, a combination thereof, or may comprise these types of processors.

The availability check allows, for example, through corresponding switching conditions, the switching between a plurality of operating modes in the motor vehicle, in which the computing power is at least partially used either for vehicle-internal functions or at least partially for cloud computing tasks. This therefore provides flexible free computing power, as appropriate, to a target cloud to obtain a more effective global use of complex computing power on modern and future motor vehicles. While the computing power is used during the driving operation of the motor vehicle, in particular for executing motor vehicle functions, such as ADAS and/or IVI functions, the unused computing power may be provided as a remunerated service to a cloud network provider in case of a deactivated motor vehicle, such as when it is parked. This concept is known as Infrastructure as a Service (IaaS). In addition, Platform as a Service (PaaS) and Software as a Service (SaaS) may be provided.

Therefore, if the availability check determines that sufficient computing power is present that may be provided to a target cloud, the clouds that may be reached, and in particular how the clouds may be reached, are determined, so that a list of possible selectable clouds is generated. After the selection, which is described in more detail in the following paragraphs, the registration, usually at a management node and/or an access node of the target cloud, may be formed by at least one of the at least one server devices. Usually, the search for available clouds and the logging in occur at least partially through a wide area network (WAN), and in particular at least partially through the internet. After the registration, the computing resources of the motor vehicle may be used as an extension of the target cloud network.

These embodiments may entail advantages for different groups of people and companies. Thus, particular advantages are obtained by the operators of motor vehicle fleets to which the motor vehicle may belong. Such operators of motor vehicle fleets may provide their motor vehicles, in particular during parking phases, as computing resources to operators of public clouds, in particular fogs, and thus obtain additional revenues. Such operators of motor vehicle fleets comprise, for example, car sharing companies or leasing companies. Such operators of motor vehicle fleets may envisage providing their own public cloud service by using their motor vehicles to obtain additional income. The use of computing resources may also take place internally, so that, for example, an operator of a motor vehicle fleet and/or a manufacturer of motor vehicles may expand their own computing network through the computing nodes in their motor vehicles, thus reducing the investment for networks. During working hours, for example, when the users of motor vehicles work at the factory of the motor vehicle manufacturer, a time during which the main part of computing resources is required, motor vehicles in parking areas may be used to expand the computing network. Nonetheless, non-public clouds may be conceived that are operated, for example, by the operators of motor vehicle fleets, to lease the entire cloud or to use it for their own purposes.

The method disclosed herein provides private motor vehicle owners with the possibility to provide computing resources of their motor vehicles to operators of public clouds, particularly to achieve additional income and/or other fees. For example, free parking may be allowed at various locations where computing resources of a determined cloud are provided. When purchase contracts are signed for the motor vehicle, the manufacturer may, for example, sign corresponding framework contracts.

Particular advantages are obtained also when the target cloud is a fog. It is particularly easy to add additional computing nodes at the edge of the fog, as motor vehicles perform a corresponding login. In particular, such a use of motor vehicles also avoids the acquisition of computing nodes at the edge of the fog, or at least reduces their number. The fog network may provide more local, directly-obtainable computing power than a remote network or a conventional cloud, in which a plurality of organization and communication paths are required.

Through such clouds, particularly public clouds, and more particularly public fogs, a computing power exchange between different motor vehicles may also take place, so that, for example, motor vehicles with less computing power may use motor vehicles with higher computing power to provide additional functions within the requiring motor vehicles. In this case, one of the motor vehicles has the role of a client, which needs to solve a particular computing task, whereas another motor vehicle of the cloud may provide the required computing power. As an example, a poorly equipped motor vehicle in an urban area may use additional navigation services without requiring the computing power or the map data.

In an exemplary embodiment, within the context of the availability check, availability parameters describing a quantity of free computing power, a predicted timeframe in which the computing power will be available, and/or the energy available for performing the computing may be determined. Such availability parameters may be used both within the availability check and subsequently for selecting the target cloud, and may provide indications about whether the freeing of computing power for a cloud is "worthwhile" or fundamentally even possible. If, for example, only a small quantity of free computing power is available, and/or if it is only available for a very short period of time, usually it is not worthwhile to even try to provide this power to a target cloud, because only very simple, very short computing tasks can be performed. It is also particularly important whether a motor vehicle has a sufficient amount of energy for executing the computing while operating the computing devices.

Preferably, depending on the availability parameters, one of multiple operating modes of the motor vehicle is selected, the modes comprising an exclusion operating mode without provision of computing power to a target cloud, a cloud operating mode with provision of a maximum computing power to the cloud while the motor vehicle is off, and/or a hybrid operating mode for partial provision of computing power to the target cloud, in which at least a portion of the total available computing power is used for the driving operation of the motor vehicle. Thus, in an advantageous embodiment, three different operating modes regarding the computing resources of the motor vehicle are supported: (1) an exclusion mode, in which the computing power is provided at most for vehicle-internal functions, (2) a cloud operating mode, which allows an essentially complete freeing of computing power in favor of the target cloud, and (3) a hybrid operating mode, in which a portion of the computing power is still assigned to vehicle-internal functions during driving operations, while another portion may be freed.

The exclusion mode does not necessarily refer only to driving the motor vehicle, when all computing resources are required for vehicle-internal functions, in particular ADAS functions and/or IVI functions, because other reasons may dictate that the connection between the cloud and the motor vehicle has to be avoided, for example, because the energy available on the motor vehicle is not sufficient or a preset by a user prevents this from happening. Nonetheless, a hybrid mode is also preferably applicable, in which during the driving operation of the motor vehicle, computing resources may be freed for a target cloud, for example, when the entire infotainment experience is not required by the user.

It is possible that for entering the cloud operating mode and/or the hybrid operating mode, at least one activation condition is checked by the availability check, wherein the activation condition describes a minimum available computing power, a minimum available time period, and/or a minimum available energy. As previously mentioned, the availability parameters are very useful in this regard, because the computing power is freed only in suitable cases. The activation conditions thus represent switching conditions, because they allow switching between operating modes.

The hybrid operating mode may preferably be activated in case of, for example: (1) a coordinated automated driving of a motor vehicle within a motor vehicle convoy (i.e., a platoon or a caravan), wherein by transferring computing processes to other motor vehicles within the convoy, a free computing power is created; (2) the motor vehicle speed falling below a threshold, in which due to cessation of at least a portion of the motor vehicle functions, a free computing power is created; and/or (3) absence of use or limited use of at least a portion of the infotainment system of the motor vehicle provided with the entire computing power of the motor vehicle. It is to be noted, in particular, that during driving in convoys and/or in situations of traffic jams or slowed traffic, particular advantages are obtained when freeing computing power in a fog-like cloud, because it then becomes possible to exchange computing power also between the motor vehicles and/or between computing devices positioned on the motor vehicles, wherein short communication distances are provided within the fog. In general, for the hybrid operating mode, all operating conditions of the motor vehicle provided during driving are suitable, and they free, in a relatively short time, certain computing resources, and therefore portions of the entire computing power.

An advantageous embodiment provides that the at least one availability parameter refers to energy, particularly a charging state of a battery of the motor vehicle, and/or the presence of a power supply line to an energy source provided outside the motor vehicle particularly for charging the battery. Through the power line, a partial communication link may also be established, particularly for broadband communication with at least one cloud. Particular advantages derive also from an at least partial electrification of the power train, in which usually high capacity batteries are provided on motor vehicles, which may also be used to supply computing power for computing tasks in a target cloud. In particular, a charging state of the at least one battery of the motor vehicle may be checked, as well as whether a power connection with a vehicle-external energy source, such as a charging column, is provided. In the latter case, when a charging process of the motor vehicle has to be performed anyway, it may be essentially ensured that for all computing tasks during the charging connection, enough electric energy is available for their execution. Because a communication link to an energy supply system is already provided, such as through a correspondingly used charging cable, it is convenient to use the partial wired communication connection, which is generally also a broadband connection, as part of the communication link to the target cloud. For example, the portion provided by a charging cable of a communication link may be a WAN communication link, which also provides the access to the internet and/or other networks. Additionally, the presence of a power supply connection does not necessarily have to be a binary decisional criterion for assessing the presence of a sufficient amount of energy for freeing computing power, because particularly in motor vehicles that have a battery with higher battery capacity, even without a charging process, the provision of energy may be ensured at least for predetermined time periods. Availability parameters involving the battery may also be considered in determining an availability parameter describing a predicted time period, for example.

An advantageous embodiment provides that the determination of the predicted time period is performed on the basis of a trained usage model of the motor vehicle and/or by using usage data regarding future use of the motor vehicle. Thus, in particular, the estimate of the predicted time period, possibly also of further availability parameters, may be performed by means of a trained usage model, preferably if the usage model is trained based on the recorded past usage data of the motor vehicle. In particular, the usage behavior in the past, and thus usually the behavior of the driver in the past, are assessed to forecast whether, in general, a current operating state is adequate for providing computing power to a target cloud, or, specifically, whether a current operating state fundamentally allowing the release of computing power to a cloud will be maintained for a sufficiently long period of time, so that suitable computing tasks may effectively or advantageously be performed. If, for example, it is known from the past that the driver on workdays drives to work and parks her motor vehicle for at least a determined period of time, a useful information regarding the availability of a motor vehicle in the cloud is identified. To this end, location information may also be used, so that, for example, when the driver parks her motor vehicle on a parking lot at a friend's home to visit her friend, it may be presumed that she will stay there for a longer period of time than in the case of parking the motor vehicle directly in front of a post office or similar transitory place. If a corresponding access is present, for example, on the schedule calendar of the driver, known usage data may also be used in the future. If, for example, it is known that the driver has fixed an appointment and its duration, the time period may also be predicted in which the motor vehicle is parked. Regarding the hybrid mode, the estimate refers to holding certain driving operating states, wherein particularly in case of driving states such as in traffic jams or similar situations, data describing the traffic situation may also be accessed to determine the predicted time period. To learn a usage model, known techniques of machine learning may be used, such as particularly suitable training algorithms for training of neuronal networks or similar techniques. Also, "deep-learning" techniques may be particularly suitable in this regard.

As previously mentioned, it is particularly advantageous if at least one of the availability parameters is considered also as a selection parameter for selecting the target cloud. A lot of information relevant to the basic question of whether a release of computing power has to occur may also be relevant to the question of at which of the currently available clouds a release has to take place, as detailed in the following paragraphs.

In general, in evaluating the availability, at least one availability parameter is considered. Additionally or alternatively, in selecting the target cloud, at least one selection parameter is considered. At least one selection parameter may also be an availability parameter, and/or at least one availability parameter may also be a selection parameter.

In particular, as an availability parameter and/or as a selection parameter, time data describing the current point in time, a current operating parameter of the motor vehicle, a current operating state of the motor vehicle, a number of persons in the motor vehicle, a current battery charging status of a battery of the motor vehicle, a learned and/or a historical piece of information regarding the usage behavior of the motor vehicle, and/or the compensation achievable by means of a cloud may be used. The time information may, for example, represent the date, time, and/or the weekday to correctly associate, for example, a learned behavior regarding predicted time periods, and/or to determine how the provision of computing power to a cloud is currently compensated by an operator. Also, current operating parameters of the motor vehicle, such as speed, may be as relevant as a current binary operating state of the motor vehicle such as whether the vehicle is in driving mode, or as relevant as a more precise breakdown according to a traffic situation, such as a traffic jam or a convoy situation. Also, regarding motor vehicles that are not in driving mode, a situation may be determined in which the motor vehicle is parked or currently at the repair shop, for example. The knowledge about the number of people in the motor vehicle may determine the potential for and level of use of an infotainment system of the motor vehicle, which, for example, in turn informs the battery charge state or related information, such as whether a charging process is active. Learned and/or historical information should not only concern the usage behavior, in particular regarding predicted time periods, but also the compensation obtained through the cloud, particularly the computing power income obtained through the available cloud networks.

In an advantageous embodiment of the method, the user input may describe the clouds preferred by the driver, and/or may parametrize at least one selection criterion, which is used for selecting the target cloud. In this case, a driver-side configuration is used when a selection among a plurality of available clouds has to be performed. Specifically, the executing control device of the motor vehicle may then independently identify the target cloud to which the motor vehicle has to be logged in, based on preconfigured settings as well as further selection parameters. Such a driver-side pre-configuration may then take place, for example, through a corresponding human-machine-interface on the motor vehicle.

Additional embodiments of the method may be conceived in which the list of so-determined currently reachable clouds may also be provided to the user through a display device, and the user may activate, in real time, a user input that selects one of these clouds as a target cloud. For example, the user may make the selection prior to leaving the vehicle. Prior to that, an embodiment may ask the driver whether, in this special case, computing power has to be freed for provision to clouds, thus effectively performing an operating mode switching. In a specific embodiment, this may, for example, take place while the driver is parking or leaving the motor vehicle, for example through an "exit manager" or a digital concierge. The driver may be asked whether the available computing power of the motor vehicle may be provided to the cloud during the parking phase, and/or he or she may be required to select the target cloud from a list of available clouds. In preparation for the acquisition of the user input, it is particularly advantageous if at least one piece of additional information regarding the reachable clouds is obtained, which information is provided to the driver together with the reachable clouds. Thus, an overview of the compensations of different cloud operators associated with the current time/date may be displayed to the driver, for example.

For automatic selection of the target cloud, it may similarly be envisaged that at least one additional piece of information be considered to determine the selectable clouds, in particular the compensation for which to provide the computing power, and/or additional information describing the cloud provider. If, for example, a pre-configuration has been performed, a driver (or, in general, a user) may define the minimum compensation for providing computing power and/or the cloud operators that the driver trusts. Thus, a user-guided, but completely automatic, decision may be made.

In general, the evaluation of availability may be performed cyclically and/or when at least one event described by the operating parameters of the motor vehicle occurs. In an exemplary embodiment, an event-driven evaluation of the availability criterion is preferred, because the evaluation may react to concrete indications that an operating mode switch may be possible. Specifically, the event may be the termination and/or start of a driving phase of the motor vehicle, the opening of the motor vehicle door, the entrance into at least one predetermined traffic situation, the exiting of the predetermined traffic situation, the connection to an external energy source, the separation from the external energy source, and/or a drop of available energy below a threshold value, for example. The occurred event is considered along with the operating parameters for determining availability parameters in evaluating the availability criterion. A variety of triggering events may be considered, such as driving the motor vehicle in a traffic jam and/or in a convoy, or termination of such a traffic situation. Additionally, leaving or entering the motor vehicle by people, and similar events, may lead to an evaluation of the availability criterion. Considering the information regarding the past event in evaluating the availability criterion is particularly advantageous, because it allows determined conditions to be targeted, while conditions that are not suitable for the corresponding event may be purposefully removed from consideration.

As previously described, an exemplary embodiment also provides that the at least one of the clouds is formed by and/or comprises other traffic participants, wherein when selecting this cloud as the target cloud, in particular at least one computing task is transferred from one of the other traffic participants. It is particularly advantageous in this case if the cloud is a fog, because then nearby computing resources may always be used, as explained in the following paragraphs. In particular, when driving in a convoy (i.e., platooning or caravanning), in a traffic jam situation, and/or in slow traffic conditions, such an embodiment is particularly advantageous.

If the target cloud is a fog, then a particularly preferred embodiment provides that a vehicle-external control device, such as a management node, of the target cloud, after logging in of the motor vehicle to the target cloud, assigns a computing task of a requesting device to the motor vehicle. The requesting device has a minimum communication path through the fog to the motor vehicle, and/or a spatial distance to the motor vehicle, which allows the creation of a direct communication link between the motor vehicle and the requesting device.

In particular, when a requesting device (as a client), such as a device of the "Internet of Things," near the motor vehicle requests a cloud-computing service through its corresponding communication link, a control device of the fog network is then required to find a motor vehicle that is nearest to the requesting device and request the execution of the computing task. The "nearness" may be understood in two ways. On one hand, when the communication has to go through the fog, it may refer to the communication path between the motor vehicle and the requesting device, for example by using a measure that counts the number of intermediate stations/nodes along the communication route. However, it is particularly preferred if an actual spatial distance is considered, so that a direct communication link may be created between the motor vehicle and the requesting device. In both cases, the data exchange and the communication of the results of the computation may be faster, so that network transmission latencies are greatly reduced. In particular, it has been found that a considerable reduction of latency times is obtained with respect to a processing of such computing tasks within the target cloud itself. The use of the nearest motor vehicle also allows a considerably better predictability of computing times. Finally, unnecessary data transmissions to very remote computing nodes, such as on the internet, may be avoided also.

As a direct communication link, a wireless connection, in particular a Wi-Fi connection, a Bluetooth connection, and/or a mobile radio network direct connection, for example, are used. A Wi-Fi connection comprises, in particular, vehicle-to-motor vehicle connections or vehicle-to-X-connections. To obtain a high data transmission rate in using direct connections in mobile networks, highly advanced mobile radio standards such as LTE/5G may be used. It is also advantageous that the computing task and/or task data required for executing the computing task are directly transmitted from the requesting device to the motor vehicle, and/or that resulting data are directly transmitted after the execution of the computing task from the motor vehicle to the requesting device. Here, a direct transmission refers to the use of the direct communication link. Thus, a direct data exchange may take place, as soon as the requesting device as "client" and the motor vehicle as "host" are reciprocally assigned by the control device.

In particular, when direct communication links (i.e., direct connections) have to be established between the requesting device and the motor vehicle, both the requesting device and the motor vehicle may provide their current geolocations to the control device to perform the corresponding check.

It must again be emphasized that such considerations, when using a fog as a target cloud, do not only refer to a stationary/parked motor vehicle, because in the hybrid operating mode, corresponding optimizations may also be made. For example, among motor vehicles within a convoy, stuck in a traffic jam, and/or in slow traffic, when motor vehicles are driving near to each other, a mutual offering and usage of computing power may take place. In particular, in this case, a direct vehicle-to-motor vehicle connection between the individual motor vehicles that are near to each other within the traffic situation may be established. Thus, when a first motor vehicle sends the computing task to another motor vehicle, the latter, without requiring long latency times, sends back the computation results as resulting data to the first motor vehicle.

An advantageous embodiment provides that one of the control devices of the target cloud sends the computing task redundantly to two different computing nodes in the cloud, of which at least one is the motor vehicle and in particular the other is another motor vehicle. An advantageous embodiment may also provide that a computing task in the target cloud is provided to two motor vehicles for redundant execution. This is particularly convenient when an event occurs in which the availability criterion may require a change of operating mode, particularly to an exclusion mode, or in which a termination criterion is fulfilled. The driver of a motor vehicle may, for example, randomly step into the motor vehicle, so that possibly the further execution of the computing task is interrupted and thus prevented from completing. If the computing task is sent to multiple motor vehicles, particularly at least two motor vehicles, the possibility of interrupting a still-unfinished computing task may be reduced.

The present disclosure also relates to a motor vehicle, which is provided with at least one computing device providing computing power, a communication device for communicating with at least vehicle-external clouds having at least one server device, and a control device adapted for executing the method disclosed herein, as long as the method may be executed in the motor vehicle. All statements regarding the method disclosed herein may be transferred analogously to the motor vehicle, so that the same aforementioned advantages may be obtained. The control device may be a control apparatus of the motor vehicle, for example, that may access and control the at least one computing device and communication device and that may perform a suitable reconfiguration of the computing device (s) in case of a change in the operating mode.

Figure 1:
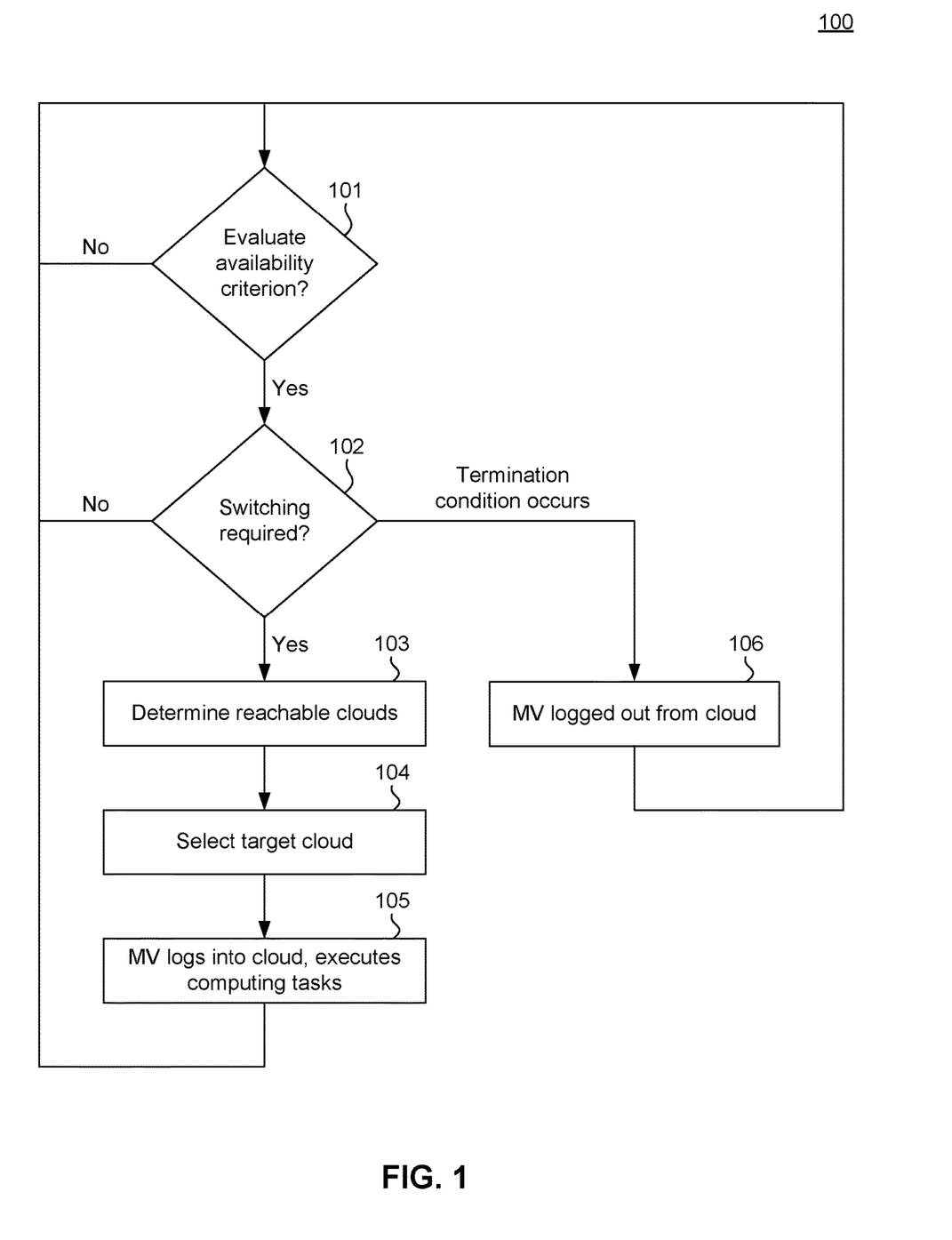
FIG. 1 shows a flow chart of an exemplary embodiment of the method disclosed herein.
Figure 2:
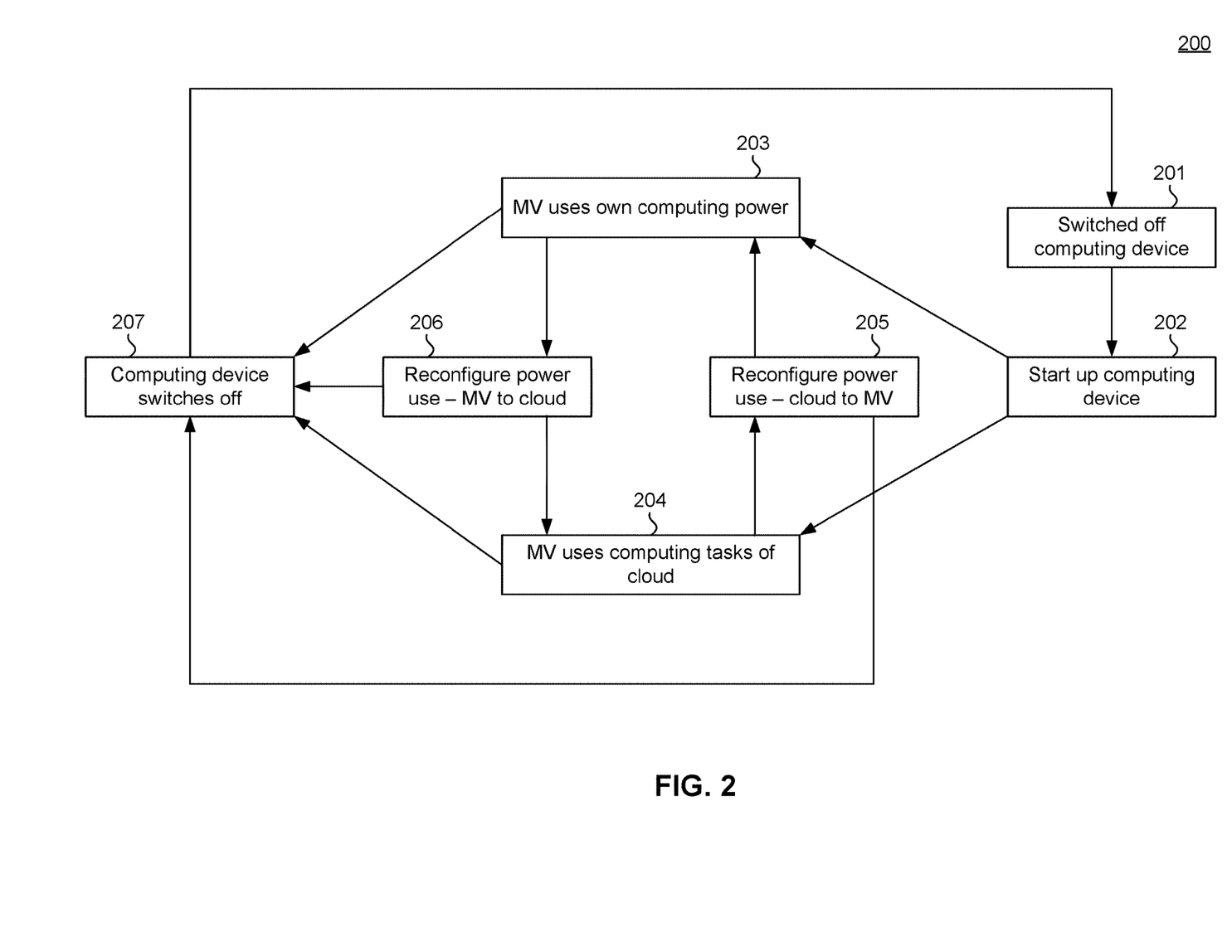
FIG. 2 shows an example state diagram for computing devices in a motor vehicle.
Figure 3:
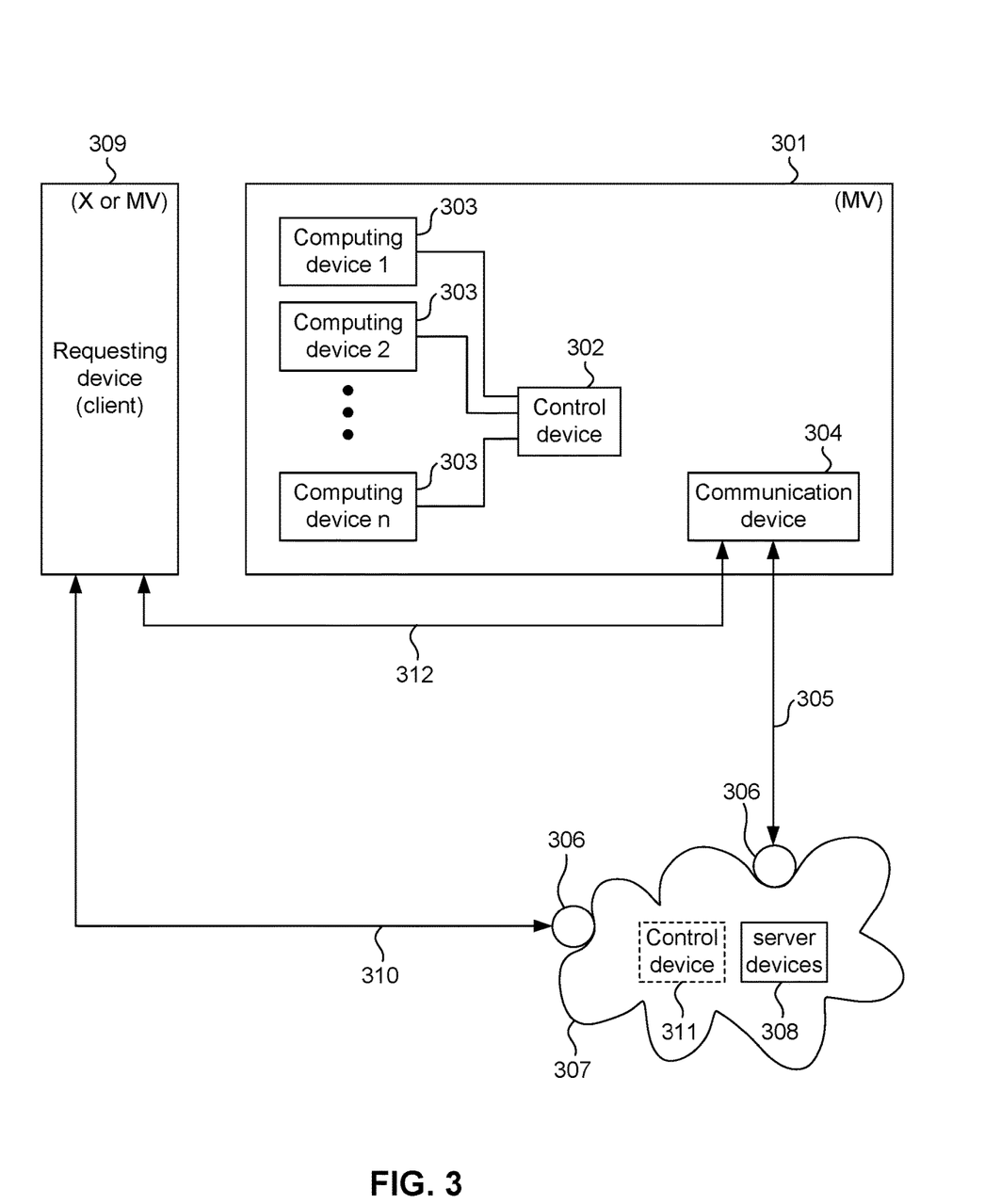
FIG. 3 shows an example system architecture for an exemplary embodiment of a motor vehicle in communication with a target cloud to execute the method.

Further advantages and details of the disclosure are obtained from the exemplary embodiments described in the following paragraphs and from the drawings. In particular:

FIG. 1 shows a flow chart of an example of the method disclosed herein, according to some embodiments;

FIG. 2 shows a possible state diagram for computing devices in a motor vehicle, configured to execute the method disclosed herein, according to some embodiments; and FIG. 3 shows an exemplary system architecture in the case of using the motor vehicle in communication with a target cloud, configured to execute the method disclosed herein, according to some embodiments.

FIG. 1 shows a flow chart 100 of an exemplary embodiment of the method steps that may be executed within a motor vehicle by a control device therein. In this case, for example, the motor vehicle has an electric motor, which may be powered by a rechargeable battery. The motor vehicle also has various computing devices, as provided in many motor vehicle systems, through which computing power may be provided. The computing devices respectively have at least one processing core and may be, for example, one-core processors or multiple core processors, comprising, for example, a CPU, GPU, and/or NPU, or combinations thereof. By means of the computing power provided by the computing device, functions of the motor vehicle systems may be performed on the motor vehicle. For example, a motor vehicle system adapted for the completely automated driving of the motor vehicle is envisaged. A further motor vehicle system may be an IVI-system. Both of these examples of motor vehicle systems have respective functions that are very complex from a computational point of view, so that the corresponding computing devices require considerable computing power. The motor vehicle in the present example also has at least one communication device, through which the motor vehicle may communicate with other motor vehicles, Bluetooth devices, mobile radio networks, and/or devices on the internet, for example. In particular, the at least one communication device also allows a connection to various vehicle-external clouds respectively having at least one server device, where the connection is usually though a plurality of server devices or generally through a plurality of computing nodes. A special form of clouds is a so-called fog, in which the computing power may prevalently be provided at the edge of the clouds, and in which the presently disclosed method and motor vehicle embodiments may be used for particular advantage, as explained in the following paragraphs.

The example of an operating method for the motor vehicle describes how a computing power of the motor vehicle is provided to one of these clouds, in particular a fog, particularly in consideration of compensating a defined or definable computing power. To this end, the motor vehicle may operate, with reference to computing power, in three operating modes, for example: (1) an exclusion mode, in which no computing power can be provided to the cloud; (2) a cloud mode, in which the motor vehicle is not in the driving mode of operation and in which a maximum computing power may be freed to the cloud; and (3) a hybrid operating mode, in which at least a portion of the entire available computing power is used for driving the motor vehicle, while free computing power may still be provided to the cloud, despite the current driving of the motor vehicle. The exclusion mode does not necessarily refer to driving operation of the motor vehicle, but can also be present outside of phases, when the motor vehicle is used for driving but when not enough energy is available for providing the computing power, and/or when a predicted time period in which the computing power will be available is too short.

According to FIG. 1, at step 101, a check is performed to determine whether an availability criterion has to be evaluated, which eventually determines the operating mode in which the motor vehicle has to be operated. In particular, a cyclical check of the availability criterion may be performed, but preferably at step 101 the presence of a triggering event is checked, wherein a variety of different triggering events may be envisaged, such as opening and closing motor vehicle doors, actuating or extracting starting keys, activating or deactivating the ignition system, detecting various operating conditions, in particular driving situations, and similar events.

At step 102, the availability criterion is evaluated, wherein a multiplicity of availability parameters are used or determined and considered. The availability parameters may preferably be information detected at step 101, in particular operating parameters and/or the operating state, such as the fact that the motor vehicle is connected to an external energy source to charge the battery. The availability parameters also comprise the quantity of free computing power, a predicted time period in which the computing power will be available, and the energy available for performing the computations. In particular, the time period is preferably learned by evaluating the usage behavior, particularly through processes of "deep learning." A predicted time period may be determined from a past usage date of the motor vehicle recorded for training the usage model and a usage date for future use of the motor vehicle. From this, calendar data can be determined, showing the duration of a scheduled activity, and the time during which the motor vehicle is parked, for example. The process of determining predicted time periods based on a usage model can also be applied to determine availability parameters, which may also comprise time data (date/time/weekday), current location, and similar data. Methods of machine learning may also be used for other availability parameters, in particular with reference to estimates about the hybrid operating mode. For example, a usage model can be used to determine the user profile of IVI for certain drivers/passengers.

The availability criterion evaluated at step 102 finally contains a number of switching criteria/switching conditions, which determine when a switching between one operating mode to another operating mode has to take place. For example, switching can be from the exclusion mode to the cloud mode, and/or from the cloud mode and/or the hybrid mode back to the exclusion mode. Such a switching condition may also be indicated as a termination condition. Correspondingly, switching conditions causing switching in operating modes, which provide computing power to the cloud, may be called activation conditions.

For example, to fulfill an activation condition, it may be required that a certain minimum computing power is available, possibly for at least a minimum time period and/or when at least a minimum energy is present. In other words, activation conditions may be defined in which a freeing of computing power in favor of a cloud is appropriate, in particular in which at least a computing task from the cloud may be processed.

Regarding the hybrid operating mode, activation conditions need not necessarily be checked immediately, but it can be determined first which driving situation is present. For example, it is appropriate to activate the hybrid operating mode in case of a coordinated automated driving of the motor vehicle within a motor vehicle convoy, in a traffic jam, or when infotainment systems are not used while driving.

Regarding the availability parameters related to energy provisioning, the charging status of the battery in the motor vehicle may be checked, in particular when the motor vehicle is parked and no charging is predicted. When computing power is provided to the cloud from the motor vehicle during a parking situation, it is useful to establish a connection to an external energy source for charging the motor vehicle battery. This is particularly advantageous when a broadband partial communication link is provided through a charging cable, which may contribute to the communication connection to the cloud. Such partial WAN communication links have already been proposed to manage data transmission to energy providers, for example.

User input data may also be used in the availability criterion, such as when a driver leaving the motor vehicle is asked whether the provision of computing power to the cloud is desired. This may occur, for example, through a digital concierge. However, it is preferred to keep the evaluation of the availability criterion at step 102 essentially automated.

If the evaluation of the availability criterion at step 102 indicates that the current operating mode of the motor vehicle has to be maintained, the process turns again to step 101. If an activation condition is fulfilled, i.e., if computing power has to be provided to a cloud in the future, the process proceeds to step 103. In step 103, the currently reachable clouds to which computing power may be provided are determined by means of the communication device.

At step 104, a target cloud for the provision of computing power is selected from the currently available clouds as a function of selection parameters. A portion of the availability parameters may also be used as selection parameters. Wherein the selection at step 104 is preferably automatically performed, without a list of available clouds being displayed to the user, selection parameters may also include user inputs for a manual selection in alternative embodiments. Where the user performs a manual selection, it is preferred that user input is provided through a corresponding input mask of a human-machine interface (HMI) of the motor vehicle, for example, to define selection parameters. Such selection parameters may be used, for example, to parametrize selection criteria for selecting the target cloud. For example, it may be envisaged that a driver specifies in advance which clouds he prefers, which clouds should not be used as target clouds, and which types of compensation are acceptable, for example. As an alternative to the input of such selection parameters by a user, the use of machine learning may also be envisaged, while a user still manually selects the clouds.

The list of currently available clouds determined at step 103 may preferably also contain additional information, which may be considered in the selection, such as the type and amount of computing power compensation. In case of such an automated selection of the target cloud, the selected target cloud may, for example, be the cloud offering the highest compensation. This, however, may only be a weighted selection criterion among a plurality of selection criteria. In the hybrid operating mode, it is particularly advantageous if the selected target clouds are shared by other traffic participants in the area, particularly by clients. The selected target clouds may be requested by the other traffic participants so that, for example, the respective computing tasks may be performed by a nearby motor vehicle without any excessive latency. This represents a particular embodiment of the fog, in which the computing power is provided at the edge of the cloud, as near as possible to the client. The following paragraphs explain how this may be implemented in a particularly useful way for embodiments in motor vehicles.

At step 105, the motor vehicle (MV) is logged into the target cloud and may accept and execute computing tasks from the target cloud.

If, at step 102, a termination condition occurs as a switching condition, i.e., if a switching back to the exclusion mode has to take place, the motor vehicle (MV) is again logged out from the target cloud at step 106, and the computing tasks are at least interrupted, possibly completely. In this context, it is to be noted that, because motor vehicle usage always entails a certain potential that the driver will return and thus interrupt the provision of computing power prior to the completion of the computing task, the control device of the target cloud preferably assigns computing tasks in a redundant way to two different computing devices in the cloud, particularly to two participating motor vehicles.

FIG. 2 schematically shows a state diagram 200 of a computing device within the motor vehicle, which may be configured correspondingly by the control device to provide its computing power to functions of motor vehicle systems or to a target cloud. Box 201 symbolizes the state "switched off," and box 202 corresponds to the state "start up." Box 203 symbolizes the use of the computing power by motor vehicle (MV) functions, particularly functions of motor vehicle systems while driving. Box 204 correspondingly indicates the use of a target cloud, into which the motor vehicle is logged, for computing tasks. Boxes 205 and 206 refer to reconfiguration processes that may be activated by the control device. Box 205 specifically refers to the reconfiguration from a use of the computing power in a cloud (hybrid or cloud operating mode) to the use for motor vehicle (MV) systems (hybrid or exclusion mode). Box 206 refers to a reconfiguration from the use for motor vehicle (MV) systems to the availability mode for the target cloud. The control device also controls the execution of a computing task of the target cloud by assigning partial tasks/computing steps to different computing units of the computing devices, allowing also for parallel computing.

Box 207, symbolizing a switching off of the computing device, terminates the state diagram 200.

FIG. 3 schematically shows a computing system 300 that may be formed to execute an embodiment of the method disclosed herein, with a motor vehicle in communication with a target cloud. A schematic diagram of motor vehicle 301 is shown, comprising the computing devices (CD) 303 and the communication device 304, communicating with the control device 302, executing the method of FIG. 1. Further components of motor vehicle 301 are left out for clarity, such as the battery, a vehicle-side charging device, and other components not specifically called out by the method steps.

The motor vehicle 301 may communicate via a first communication link 305 through an access node 306 with the target cloud 307, in this case a fog, thus using, in particular, server devices 308 of the target cloud 307.

In the exemplary embodiment, a requesting device 309 is also shown as a client, which requests the execution of a computing task through the target cloud 307. This client may, for example, be a device of the "Internet of Things." To this end, a second communication link 310 is shown between the requesting device 309 and the target cloud 307, through an access node 306. Once the requesting device 309 and the motor vehicle 301 have provided their current geolocations, for example, as geodetic coordinates, a control device 311 of the target cloud 307 (which may also correspond to one of the access nodes 306) may determine that the computing node nearest to the requesting device 309 is the motor vehicle 301 logged into the target cloud 307. This motor vehicle (MV) may be so near to the requesting device 309 that a direct communication link 312 may be established between the motor vehicle 301 and the requesting device 309, for example through car-to-car communication (if the requesting device 309 is also a motor vehicle), or through car-to-X communication. The third communication link 312, as a direct communication connection, allows the direct exchange of computing tasks and/or resulting data, so that latencies are considerably reduced. In a fog, the requesting device 309 is associated with the nearest computing node, i.e., the motor vehicle 301.

If a direct communication link 312 is not provided or is impossible, it may also be considered to select the motor vehicle 301 on the basis of the shortest communication path through the target cloud 307. The direct communication link 312 may be, for example, a Wi-Fi connection, a Bluetooth connection, a direct mobile network radio connection, particularly an LTE/5G connection, a Car2X connection, a V2X connection, or similar connection.

The invention claimed is:

1. A method for operating a motor vehicle comprising at least one computing device providing computing power, a communication device for communicating with at least one vehicle-external cloud each provided with at least one server device, and a control device, wherein the method comprises:
    performing, by the control device, an availability check to determine an availability of free computing power of the motor vehicle, wherein the motor vehicle is configured to provide:
        no computing power to the at least one vehicle-external cloud when an entirety of the free computing power is used for driving operations of the motor vehicle,
        a maximum computing power to the at least one vehicle-external cloud when the motor vehicle is not operational, and
        a partial computing power to the at least one vehicle-external cloud when at least a portion of the entirety of the free computing power is used for the driving operations of the motor vehicle;
    indicating, by the control device, for the availability check returning a positive result, the availability of the free computing power for executing a computing task provided by the at least one vehicle-external cloud;
    determining, by the control device, at least one vehicle-external cloud is reachable via the communication device;
    selecting, by the control device, the at least one vehicle-external cloud reachable via the communication device, wherein the selected vehicle-external cloud is in need of the computing power;
    establishing, by the control device, a communication link with the selected vehicle-external cloud via the communication device; and
    logging, by the control device, the motor vehicle into the selected vehicle-external cloud as a provider of the computing power.

2. The method of claim 1, wherein the performing the availability check comprises:
    analyzing, by the control device, at least one availability parameter describing a quantity of free computing power, a predicted time period for the free computing power, or an amount of available energy for computing.

3. The method of claim 2, further comprising:
    based on the analysis of the at least one availability parameter, selecting, by the control device, one of a plurality of operating modes of the motor vehicle, wherein the plurality of operating modes comprise:
        an exclusion operating mode, without provision of the computing power to a cloud;
        a cloud operating mode, with provision of a maximum computing power to the selected at least one vehicle-external cloud, when the motor vehicle is not operational; and
        a hybrid operating mode, with provision of partial computing power to the selected at least one vehicle-external cloud, wherein at least a portion of the entirety of the free computing power is used for the driving operations of the motor vehicle.

4. The method of claim 3, wherein selecting the hybrid operating mode comprises:
    determining, by the control device, speed of the motor vehicle falling below a threshold value to transfer the partial computing power to the selected at least one vehicle-external cloud; or
    determining, by the control device, usage of an infotainment system of the motor vehicle to transfer the partial computing power to the selected at least one vehicle-external cloud; or
    in response to coordinated automated driving of the motor vehicle, transferring, by the control device, computing processes to other motor vehicles to transfer the partial computing power to the selected at least one vehicle-external cloud.

5. The method of claim 2, wherein the at least one availability parameter is a charging status of a battery of the motor vehicle or a presence of a power connection with a vehicle-external energy source for charging the battery.

6. The method of claim 2, wherein determining the predicted time period comprises using, by the control device, a trained usage model of the motor vehicle; or applying, by the control device, known past usage data to a planned future use of the motor vehicle.

7. The method of claim 1, wherein the selecting of the at least one vehicle-external cloud is based on at least one user input, or at least partially automatically.

8. The method of claim 7, further comprising:
    displaying, by the control device, to the driver the at least one vehicle-external cloud reachable via the communication device.

9. The method of claim 7, wherein the selecting of the at least one vehicle-external cloud at least partially automatically comprises evaluating, by the control device, at least one availability parameter.

10. The method of claim 1, wherein the selecting of the at least one vehicle-external cloud is based on at least one user input that describes at least one vehicle-external cloud preferred by the user, or at least one selection criterion.

11. The method of claim 1, further comprising:
    requesting, by the control device, at least one computing task to be taken over by the motor vehicle from the selected vehicle-external cloud, wherein the selected vehicle-external cloud comprises other traffic participants.

12. The method of claim 11, further comprising:
    receiving, by the control device, at least one computing task from a vehicle-external control device of the selected vehicle-external cloud, wherein the selected vehicle-external cloud is a fog, and wherein the at least one computing task originates from a requesting device positioned at a distance from the motor vehicle; and
    establishing, by the control device, a direct communication connection between the motor vehicle and the requesting device through the fog.

13. The method of claim 12, wherein the direct communication connection is a wireless connection over which the at least one computing task or task data required for executing the at least one computing task is directly transmitted from the requesting device to the motor vehicle.

14. A motor vehicle having at least one computing device providing computing power, a communication device for communicating with at least one vehicle-external cloud each provided with at least one server device, and a control device configured to:
- perform an availability check to determine an availability of free computing power of the motor vehicle, wherein the motor vehicle is configured to provide:
  - no computing power to the at least one vehicle-external cloud when an entirety of the free computing power is used for driving operations of the motor vehicle,
  - a maximum computing power to the at least one vehicle-external cloud when the motor vehicle is not operational, and
  - a partial computing power to the at least one vehicle-external cloud when at least a portion of the entirety of the free computing power is used for the driving operations of the motor vehicle;
- indicate, for the availability check returning a positive result, the availability of the free computing power for executing a computing task provided by the at least one vehicle-external cloud;
- determine at least one vehicle-external cloud reachable via the communication device;
- select the at least one vehicle-external cloud reachable via the communication device, wherein the selected vehicle-external cloud is in need of the computing power;
- establish a communication link with the selected vehicle-external cloud via the communication device; and
- log the motor vehicle into the selected vehicle-external cloud as a provider of the computing power.

15. The motor vehicle of claim 14, wherein to perform the availability check, the control device is further configured to:
- analyze at least one availability parameter describing a quantity of the free computing power, a predicted time period for the free computing power, or an amount of available energy for computing.

16. The motor vehicle of claim 15, wherein the control device is further configured to:
- select one of a plurality of operating modes of the motor vehicle based on the analysis of the at least one availability parameter,
- wherein the plurality of operating modes comprises:
  - an exclusion operating mode, without provision of the computing power to a cloud;
  - a cloud operating mode, with provision of a maximum computing power to the selected at least one vehicle-external cloud, when the motor vehicle is not operational; and
  - a hybrid operating mode, with provision of partial computing power to the selected at least one vehicle-external cloud, wherein at least a portion of the entirety of the free computing power is used for the driving operations of the motor vehicle.

17. The motor vehicle of claim 15, wherein the at least one availability parameter is a charging status of a battery of the motor vehicle or a presence of a power connection with a vehicle-external energy source for charging the battery.

18. The motor vehicle of claim 15, wherein to determine the predicted time period, the control device is further configured to:
- use a trained usage model of the motor vehicle; or apply known past usage data to a planned future use of the motor vehicle.

19. The motor vehicle of claim 14, wherein the control device is further configured such that selecting a target cloud from among the at least one selected vehicle-external cloud is performed manually, depending on at least one user input, or is performed at least partially automatically.

20. The motor vehicle of claim 19, wherein the control device is further configured to display, to the driver, the selected vehicle-external cloud via the communication device.

* * * * *